(12) United States Patent
Im et al.

(10) Patent No.: US 12,097,861 B2
(45) Date of Patent: Sep. 24, 2024

(54) METHOD FOR GENERATING ROAD TOPOLOGY INFORMATION AND SYSTEM THEREOF

(71) Applicant: MORAI INC., Seoul (KR)

(72) Inventors: Changhyun Im, Seoul (KR); Hyunjin Park, Seoul (KR)

(73) Assignee: MORAI INC., Seoul (KR)

( * ) Notice: Subject to any disclaimer, the term of this patent is extended or adjusted under 35 U.S.C. 154(b) by 0 days.

(21) Appl. No.: 18/057,102

(22) Filed: Nov. 18, 2022

(65) Prior Publication Data
US 2023/0084021 A1 Mar. 16, 2023

Related U.S. Application Data

(63) Continuation of application No. PCT/KR2021/017917, filed on Nov. 30, 2021.

(30) Foreign Application Priority Data

Sep. 17, 2021 (KR) .......................... 10-2021-0124490

(51) Int. Cl.
*B60W 40/072* (2012.01)
(52) U.S. Cl.
CPC ....... *B60W 40/072* (2013.01); *B60W 2556/40* (2020.02)
(58) Field of Classification Search
CPC ........... B60W 40/072; B60W 2556/40; B60W 2556/50; B60W 30/0956; B60W 60/001
See application file for complete search history.

(56) References Cited

U.S. PATENT DOCUMENTS

| 7,084,882 B1 * | 8/2006 | Dorum | G01C 21/3867 |
| | | | 345/592 |
| 2007/0008090 A1 * | 1/2007 | Gertsch | B60T 8/243 |
| | | | 340/435 |
| 2009/0138188 A1 | 5/2009 | Kores et al. | |
| 2012/0050293 A1 | 3/2012 | Carlhian et al. | |

(Continued)

FOREIGN PATENT DOCUMENTS

BR    PI0520514 A2    5/2009
CN    105205841 A  * 12/2015

(Continued)

OTHER PUBLICATIONS

Gonzalez Bautista, David, "Functional architecture for automated vehicles trajectory planning in complex environments." PSL Research University, 2017, 161 pages.

*Primary Examiner* — Peter D Nolan
*Assistant Examiner* — Anwar Mohamed
(74) *Attorney, Agent, or Firm* — Banner & Witcoff, Ltd.

(57) ABSTRACT

The present disclosure provides a method for generating road topology information performed by at least one processor. With respect to coordinate data of a road, boundary conditions between segments including topology information may be calculated to make the connection between segments flexible, and a midpoint of a curve of a segment may be detected to directly calculate control points of a Bézier curve, thereby generating a parametric Bézier curve. Accordingly, more precise road map may be generated even when the coordinate data of the segment of the road includes an error.

17 Claims, 10 Drawing Sheets

(56) References Cited

U.S. PATENT DOCUMENTS

| | | | |
|---|---|---|---|
| 2014/0222331 A1 | 8/2014 | Dorum et al. | |
| 2014/0358436 A1* | 12/2014 | Kim | G01C 21/3822 |
| | | | 701/532 |
| 2018/0201264 A1* | 7/2018 | Schoenly | B61L 25/025 |
| 2019/0204098 A1 | 7/2019 | Sunil Kumar et al. | |
| 2019/0391583 A1* | 12/2019 | Ning | G01S 17/89 |
| 2020/0122721 A1* | 4/2020 | Zhang | B60W 60/00274 |
| 2021/0370968 A1 | 12/2021 | Xiao et al. | |
| 2021/0381838 A1* | 12/2021 | Cajias | G01C 21/3889 |

FOREIGN PATENT DOCUMENTS

| | | |
|---|---|---|
| EP | 0463574 A2 | 1/1992 |
| KR | 10-2017-0068021 A | 6/2017 |
| KR | 10-2020-0096724 A | 8/2020 |
| KR | 102237559 B1 | 4/2021 |

\* cited by examiner

METHOD FOR GENERATING ROAD TOPOLOGY INFORMATION AND SYSTEM THEREOF

CROSS-REFERENCE TO RELATED APPLICATION

The present application is a continuation of International Patent Application No. PCT/KR2021/017917, filed on Nov. 30, 2021, which is based upon and claims the benefit of priority to Korean Patent Application No. 10-2021-0124490, filed on Sep. 17, 2021. The disclosures of the above-listed applications are hereby incorporated by reference herein in their entirety.

BACKGROUND

Field

The present disclosure relates to a method for generating road topology information and a system thereof, and more particularly, to a method for generating road topology information (e.g., implemented based on Bézier curve modeling) when implementing autonomous driving simulation in virtual environment, and a system thereof.

Discussion of the Background

Recently, autonomous vehicles are gaining rapidly increased attention, and along with this, many studies are conducted on generating road topology information for simulating autonomous driving.

Road topology information may include data points representing roads. When a virtual road is generated by connecting these data points with straight lines, errors may occur between the actual road and the virtual road. A small difference between actual and virtual roads can lead to unexpected accidents. In particular, when an autonomous vehicle drives the actual road based on the virtual road generated in virtual environment, this may lead to a serious accident. Accordingly, an effort to minimize the error between the actual road and the virtual road is required, and for example, when the error between the actual road and the virtual road meets a range within 10 cm, it can be considered stable.

Meanwhile, the road topology information may be generated by using a Bézier curve to express the curve of the road. In this regard, the method for generating road topology information disclosed in Korean Patent Application Laid-Open No. 10-2017-0068021 (hereinafter, "KR10-2017-0068021") replaces the data points described above with control points to generate a Bézier curve.

In KR10-2017-0068021, when there is an error in data points, a Bézier curve generated by using the data points as the control points is also affected by the error. In addition, when the polynomial with a higher order is applied to reduce the error between the actual road and the virtual road, this can result in generation of a curve having a shape different from the shape of the actual road. As a result, a large error occurs between the actual road and the virtual road, resulting in a problem when applied to a simulation or actual operation of the autonomous vehicle.

SUMMARY

In order to solve the problems described above, the present disclosure provides a method for generating road topology information and a system thereof.

The present disclosure provides a method for generating road topology information in virtual environment, which generates the road topology information that minimizes an error between an actual road and a virtual road and enables more flexible curve driving, and a system thereof.

The present disclosure may be implemented in a variety of ways, including a method, an apparatus (system), or a non-transitory computer-readable storage medium storing instructions.

According to an embodiment of the present disclosure, a method for generating road topology information is provided, which may be performed by a processor of an information processing system and include with respect to coordinate data of a road, calculating boundary conditions between segments including topology information, generating a curve of a segment in a polynomial form in a coordinate system corresponding to the boundary conditions, and detecting a midpoint of the curve by using the generated polynomial, calculating control points of a Bézier curve based on the detected midpoint of the curve and the boundary conditions, and generating a parametric Bézier curve by using the calculated control points.

According to an embodiment, the calculating the boundary conditions may include calculating, by the processor, the boundary conditions by using boundary points of a target segment to generate a curve, first coordinate data included in a preceding segment of the target segment, second coordinate data included in the target segment, and third coordinate data included in a next segment of the target segment.

According to an embodiment, the calculating the boundary conditions may include calculating the boundary conditions by further using at least one of fourth coordinate data included in the preceding segment of the target segment and adjacent to the boundary points or fifth coordinate data included in the next segment of the target segment and adjacent to the boundary points.

According to an embodiment, the detecting the midpoint of the curve may include: generating an n-th degree polynomial by using the boundary conditions for the curve of the segment; and calculating the n-th degree polynomial to detect the midpoint of the curve.

According to an embodiment, the detecting the midpoint of the curve may include, in response to determining by the processor that an n-th degree polynomial cannot be generated by using the boundary conditions for the curve of the segment, detecting coordinate data positioned at a center among coordinate data forming the segment, as a midpoint of the curve.

According to an embodiment, the calculating the control points may include acquiring control points by calculating a polynomial of an interpolation parameter by using the midpoint of the detected curve, boundary points, and the boundary conditions of the segment.

According to an embodiment, the detecting the midpoint of the curve may include: generating an n-th degree polynomial for the curve of the segment; coinciding a slope direction of the boundary point of the segment with the x-axis of the coordinate system through coordinate system transformation corresponding to the boundary conditions; and detecting the midpoint of the curve by calculating the n-th degree polynomial by using the boundary point of the segment.

According to an embodiment, the detecting the midpoint of the curve may include, when an error between coordinate data forming the segment is within a reference tolerance range and the number of these exceeds a reference range, detecting coordinate data positioned at a center among the coordinate data forming the segment, as a midpoint of the curve.

According to an embodiment, the calculating the control point may include generating a polynomial of an interpolation parameter by using one of the boundary points of the segment as an origin; and acquiring a control point by calculating a polynomial of an interpolation parameter by using a midpoint of the detected curve and a slope of the boundary point of the segment.

According to an embodiment, after generating the parametric Bézier curve, the method may further include calculating an error between the generated parametric Bézier curve and the coordinate data of the road, and monitoring whether the calculated error is out of a preset error range.

According to an embodiment, the method for generating road topology information may include, in response to determining that the calculated error is out of the preset error range, dividing a section of the segment of the road into a plurality of sub-segments, and repeating the steps for generating the parametric Bézier curve described above for each of the divided sub-segments.

According to an embodiment of the present disclosure, an information processing system may include a memory, and at least one processor communicatively connected to the memory and configured to execute at least one computer-readable program included in the memory. Here, the at least one program includes instructions for, with respect to coordinate data of a road, calculating boundary conditions between segments including topology information, generating a curve of a segment in a polynomial form in a coordinate system corresponding to the boundary conditions, detecting a midpoint of the curve by using the generated polynomial, calculating control points of a Bézier curve based on the detected midpoint of the curve and the boundary conditions, and generating a parametric Bézier curve by using the calculated control points.

According to an embodiment of the present disclosure, a non-transitory computer-readable recording medium is provided, storing instructions that, when executed by a processor, cause a computer including the processor to implement the method described above.

According to various examples of the present disclosure, a plurality of segments obtained by dividing a path of a road can be connected to satisfy boundary conditions between them, so that a more flexible curve connection between the segments is possible, and in generating a Bézier curve, rather than simply using the coordinate data as the control points, the control points are calculated directly by using a relatively low-order polynomial and the midpoint value of the curve, and accordingly, even when there is an error in the coordinate data, there is no effect from this error, and a curve closer to the actual road can be generated.

In addition, when setting boundary conditions between a plurality of segments, not only the boundary points of the corresponding segment to generate a curve, but also the coordinate data of the preceding and next segments are referenced to, and accordingly, the connection between segments is configured more flexibly. Accordingly, it is possible to prevent the path from being changed abruptly when the autonomous vehicle passes the boundary of the segment.

In addition, in various examples of the present disclosure, since a curve function is generated using an interpolation parameter rather than coordinate data, it is also possible to express a complex road within a minimized error range. In addition, since a relatively low order is used in calculating the control points for generating the Bézier curve, it is possible to provide a high-precision road map using only minimal memory resources. Accordingly, it is possible to solve the limitations in the simulation or actual operation of the existing autonomous vehicle, and allows its use in more diverse service fields.

The effects of the present disclosure are not limited to the effects described above, and other effects not described will be able to be clearly understood by those of ordinary skill in the art (hereinafter, referred to as "ordinary technician") from the description of the claims.

BRIEF DESCRIPTION OF THE DRAWINGS

Embodiment(s) of the present disclosure will be described with reference to the accompanying drawings described below, where similar reference numerals indicate similar elements, although the embodiment(s) are not limited thereto.

DETAILED DESCRIPTION

Figure 1:
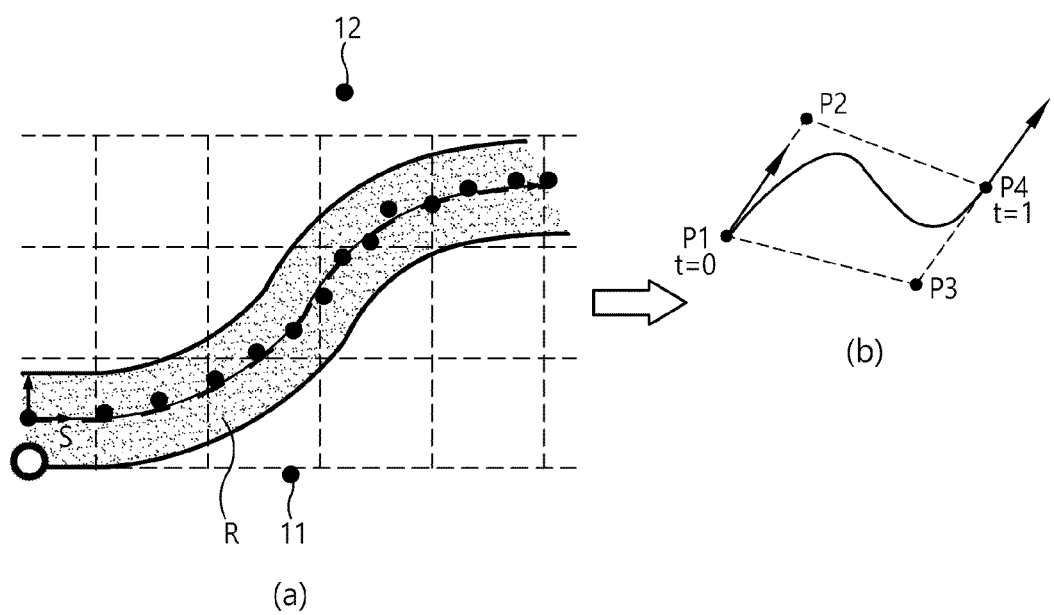
FIG. 1 is a view provided to explain a concept related to generation of road topology information according to an embodiment of the present disclosure.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the examples, duplicate descriptions of the same or corresponding components may be omitted. However, even if descriptions of components are omitted, it is not intended that such components are not included in any embodiment.

Advantages and features of the disclosed examples and methods of accomplishing the same will be apparent by referring to examples described below in connection with the accompanying drawings. However, the present disclosure is not limited to the examples disclosed below, and may be implemented in various different forms, and the present examples are merely provided to make the present disclosure complete, and to fully disclose the scope of the disclosure to those skilled in the art to which the present disclosure pertains.

The terms used herein will be briefly described prior to describing the disclosed examples in detail. The terms used herein have been selected as general terms which are widely used at present in consideration of the functions of the present disclosure, and this may be altered according to the intent of an operator skilled in the art, conventional practice, or introduction of new technology. In addition, in specific cases, certain terms may be arbitrarily selected by the applicant, and the meaning of the terms will be described in detail in a corresponding description of the examples. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a Bézier curve refers to a mathematical curve used to express a curve of a road, and is generated through a function expression using a plurality of control points as a medium.

In addition, in the present disclosure, a path of a road may be represented by a plurality of segments, in which the segments may include a relative position in relation to the previous and next segments, road topology information, for example, a plurality of coordinate data (including position and number), and the like. Segments to generate a Bézier curve according to the present disclosure are defined as target segments. In addition, it is assumed that the target segments include one or more previous and next segments for convenience of description.

In addition, in the present disclosure, since the target segments are described based on the assumption that they include a series of connected segments including both the previous and next segments, connection point of the segments and boundary points of the segments may be used as having the same meaning.

In addition, in the present disclosure, the coordinate data may refer to GPS coordinates or position coordinates corresponding thereto. For example, the coordinate data may refer to GPS coordinates, which are the position information acquired by operating the GPS at about 100 Hz at predetermined intervals (e.g., 10 msec).

FIG. 1 is a view provided to explain a concept related to generation of road topology information according to an embodiment of the present disclosure.

FIG. 1(a) illustrates certain segments among a plurality of segments generated from the segmentation of a road. Segment R goes in S direction and includes a plurality of data points. FIG. 1 illustrates a process of generating a Bézier curve with four control points $P_1$, $P_2$, $P_3$ and $P_4$. For example, two end points $P_1$ and $P_4$ and two midpoints $P_2$ and $P_3$ are used as control points, and may be defined through the following functional expression, for example, a third degree polynomial.

$$P(t)=(1-t)^3 P1+3t(1-t)^2 P2+3t^2(1-t)P3+t^3 P4, 0 \leq t \leq 1 \quad \text{[Equation 1]}$$

Conventionally, in order to generate the Bézier curve as described above, a plurality of coordinate data included in the segment R are directly used as control points. However, when some of the coordinate data includes an error exceeding a reference range, and the coordinate data including the error is used as the control points, the virtual road obtained by the generation of the Bézier curve also has a large error from the actual road.

Accordingly, in order to minimize the error between the actual road and the virtual road, the present disclosure proposes a method for generating a Bézier curve by using points 11 and 12 not included in the segment R as control points. When the Bézier curve is generated by using the points 11 and 12 not included in the segment R as mentioned above, it is hardly affected by the error even when there is the error in the coordinate data forming the segment R. The points 11 and 12 selected as the control points are directly calculated by using the method according to the present disclosure to minimize the error, which will be described in more detail below.

Figure 2:
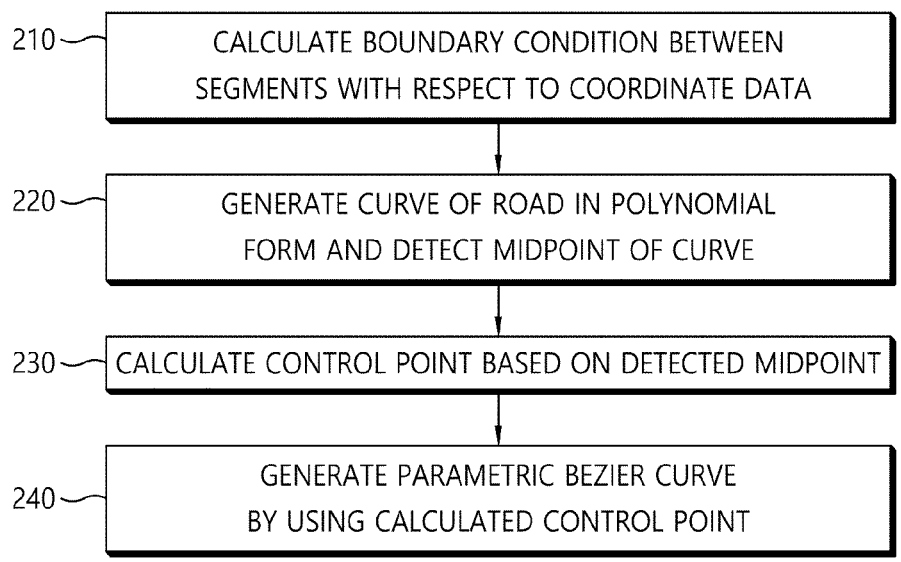
FIG. 2 is a flowchart illustrating a method for generating road topology information in virtual environment according to an embodiment of the present disclosure.
Figure 3:
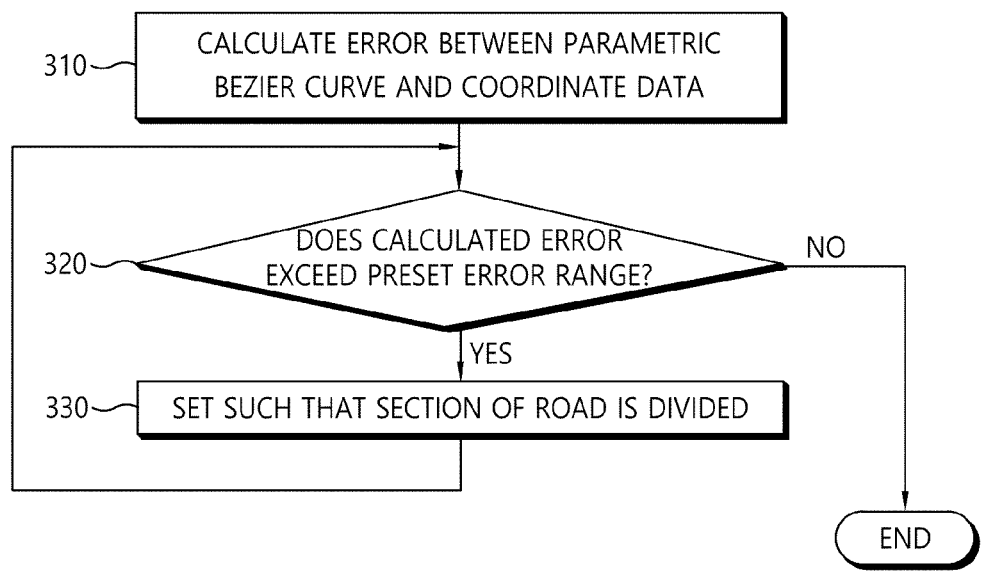
FIG. 3 is a flowchart illustrating a method for generating road topology information in virtual environment according to an embodiment of the present disclosure.

FIGS. 2 and 3 are flowcharts illustrating a method for generating road topology information in virtual environment according to an embodiment of the present disclosure. In an example, the method for generating road topology information described below may be performed by one or more processors.

Referring to FIG. 2, the processor calculates 210 boundary conditions between segments with respect to the coordinate data of a road. In an example, a path of the road may be represented by an appropriate number of segments, and a segmentation condition for the segments may be preset. For example, the processor may set to divide into segments when the error of the sampling data is out of a reference error range (or when it satisfies an error condition). In an example, the boundary conditions between segments is set by including some of the coordinate data included in the preceding segment and the next segment of a target segment together with the boundary points of the target segment. Accordingly, connection between the segments is more flexible, and it is possible to prevent an abrupt route change at the boundary of the segment when the autonomous vehicle is driving on the road. In addition, in an example, in order to remove the error of data after setting the boundary conditions between segments, a process of matching the coordinate data with the first differential value of a connection point positioned at the boundary of the target segment may be performed.

The processor may generate a curve of the road in a polynomial form and detects 220 a midpoint of the curve. Specifically, the curve of the segment of the road is generated in the polynomial form in a coordinate system that is set according to the calculation of the boundary conditions corresponding to the process 210 described above. In the present disclosure, generating the third degree polynomial is exemplified in consideration of convenience of description and computational complexity, but examples are not limited thereto and it may be defined as an n-th degree polynomial. In order to determine a unique curve for the n-th degree polynomial, (n+1) coefficients should be determined as unique values. To this end, in the present disclosure, the x-axis may be coincided with the slope direction of the connection points through coordinate system transformation and the n-th degree polynomial may be calculated by defining the connection point as the origin (0, 0), to detect the midpoint of the curve. Meanwhile, according to an example, when it is impossible or complicated to express a function on the x, y coordinate system, coordinate data positioned in the center of the target segment may be detected as a midpoint. The processor may directly calculate 230 control points based on the detected midpoint. To this end, the midpoint detected in the process 220 described above and the slope of the connection point of the target segment may be used as parameters. For example, any control points x, y may be expressed as functions x(p) and y(p) of the interpolation parameter P, and the coefficients of x(p) and y(p) may be determined by using the midpoint and the connection point. The detailed process of calculating the functions x(p) and y(p) of the interpolation parameter P by using the midpoint and the slope of the connection point will be described in more detail below with reference to FIGS. 5 and 6.

The processor may generate 240 a parametric Bézier curve by using the calculated control points. In an example, a verification process of calculating an error between the generated parametric Bézier curve and the curve of the actual road may be additionally performed. As a result of the verification, when the error is out of the reference range, segments may be additionally divided, and generating parametric Bézier curve for the divided sub-segments may be repeated. The process for this is illustrated in FIG. 3.

FIG. 3 is a flowchart provided to explain a method for reducing an error of the parametric Bézier curve generated in FIG. 2. Referring to FIG. 3, the processor calculates 310 an error between the generated parametric Bézier curve and the coordinate data of the road. Then, the processor monitors 320 whether or not the calculated error exceeds a preset error range. In an example, the preset error range may be about 10 cm. When the calculated error exceeds the preset error range, it is set 330 by the processor such that the section of the road, that is, the segment section of the road is divided. In addition, although not illustrated, the processes for generating the parametric Bézier curve described above with reference to FIG. 2 are respectively performed with respect to the divided segments (e.g., first and second sub-segments). In other words, when performing the process of setting the boundary condition for the first sub-segment, generating the polynomial, detecting the midpoint, calculating the control points, and generating the parametric Bézier curve, the process of setting the boundary condition for the second sub-segment, generating the polynomial, detecting the midpoint, calculating the control points, and generating the parametric Bézier curve are performed simultaneously or sequentially. Next, the processor returns to process 320 to check the error range for the divided segment section. The processor repeatedly executes the processes described above until the divided segment section satisfies an error range within the preset error range. Meanwhile, when the calculated error is within the preset error range, the execution of the method for reducing an error is terminated.

Figure 4:
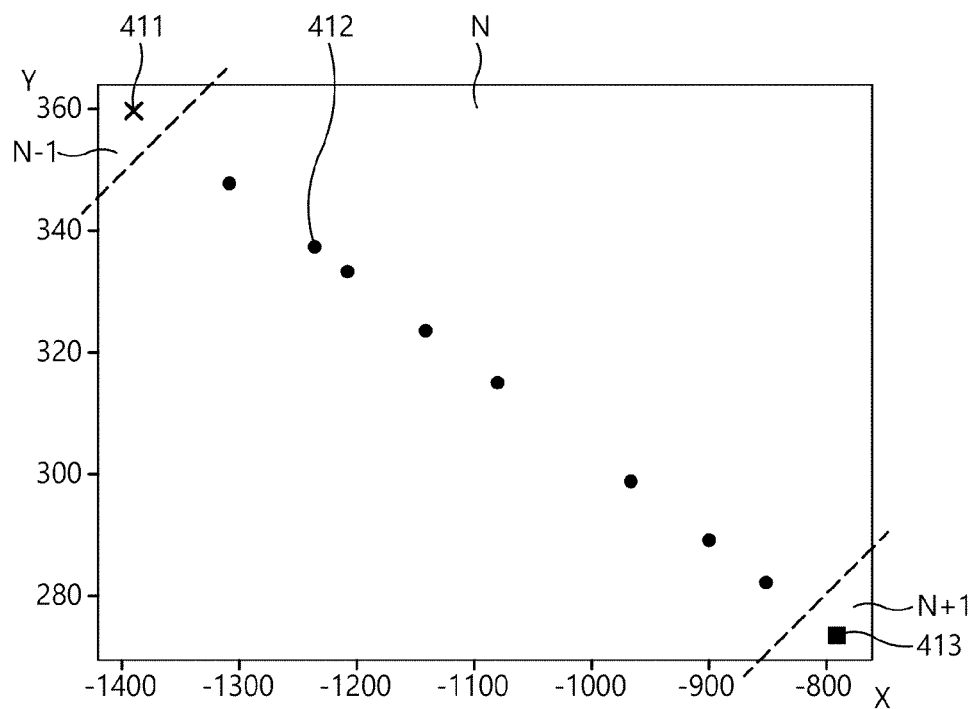
FIG. 4 is an exemplary graph for modeling a Bézier curve from coordinate data according to an embodiment of the present disclosure.

FIG. 4 is an exemplary graph modeling a Bézier curve from the coordinate data of a road according to an embodiment of the present disclosure. Specifically, FIG. 4 is a modeling of a Bézier curve from the coordinate data included in a target segment to generate a Bézier curve among a plurality of segments that can be acquired by dividing a path of a road, and describes, for example, a Bézier curve modeling for the target segment N among the plurality of segments ( . . . , N−1, N, N+1, . . . ). The boundary condition $X_M$ for the target segment N may be represented by n coordinate data having two dimensions (x, y) as values as follows.

$$X_M = \{(x_1, y_1), (x_2, y_2), \ldots, (x_m, y_m)\} \qquad \text{[Equation 2]}$$

In order to determine the boundary condition $X_M$ for the target segment N, coordinate data included in the preceding segment N−1 and the next segment N+1 of the target segment N may be used. In an example, in order to set the boundary condition, the coordinate data, from_point=$(x_0, y_0)$, of the segment N−1 preceding the first connection point $(x_1, y_1)$ of the target segment N, and the coordinate data, to_point=$(x_{n+1}, y_{n+1})$, of the segment N+1 following the second connection point $(x_n, y_n)$ of the target segment N may be used. Here, the first connection point $(x_1, y_1)$ is a start point of the coordinate data forming the target segment N, and the second connection point $(x_n, y_n)$ is an end point of the coordinate data forming the target segment N. However, examples are not limited thereto, and in another example, the boundary condition for the target segment N may be calculated by using other coordinate data forming the preceding segment N−1 and other coordinate data forming the next segment N+1, instead of from_point=($x_0$, $y_0$) and to_point=($x_{n+1}$, $y_{n+1}$). In addition, in order to set the boundary condition for the target segment N, three or more coordinate data, for example, two coordinate data in each of the preceding segment N−1 and the next segment N+1 may also be used. In an example, since this additional coordinate data is used also for calculating the boundary condition for the target segment, the coordinate data close to the boundary points of the target segment N should be selected, respectively.

Referring to FIG. 4, in order to set the boundary condition for the target segment N, last coordinate data 411 of the preceding segment N−1 and first coordinate data 413 of the next segment N+1 are used. In this way, in addition to the connection points forming the target segment N, by setting a boundary condition with some coordinate data forming the preceding segment N−1 and the next segment N+1 of the target segment N, the boundaries between segments are more flexibly connected. Accordingly, it is possible to prevent an abrupt path change of the autonomous vehicle driving on a road corresponding to the segment boundary.

For example, the slope value $b'(x_0)$ of the first connection point ($x_1$, $y_1$) of the target segment N and the slope value $b'(x_n)$ of the second connection point ($x_n$, $y_n$) of the target segment N may be expressed by Equation 3 below.

$$b'(x_0) = \frac{y_0 - y_2}{x_0 - x_2},$$

$$b'(x_n) = \frac{y_n - y_{n+2}}{n - x_{n+2}}$$

[Equation 3]

By calculating the boundary condition for the target segment N using the connection points between the divided segments described above, more flexible modeling of the Bézier curve is enabled. In the present disclosure, since the value of the boundary condition for the target segment N is still calculated as the same value in the boundary condition in the next segment N+1 of the target segment (the preceding segment N−1 of the target segment N is also the same), the connection between the front and rear segments is flexibly formed.

If the boundary condition for the target segment N is calculated, the midpoint of the Bézier curve is now detected, and based on this, control points for generating a parametric Bézier curve according to the present disclosure is directly calculated.

Figure 5:
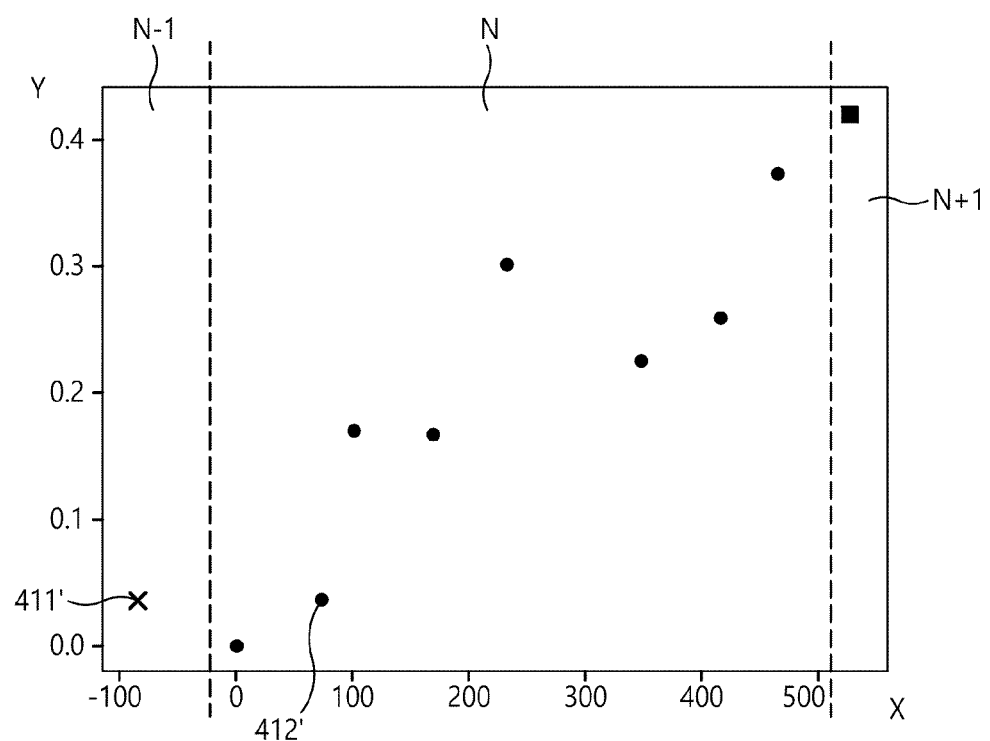
FIG. 5 is an exemplary graph provided to explain a method for generating a parametric Bézier curve based on control points calculated by using the graph of FIG. 4.
Figure 6:
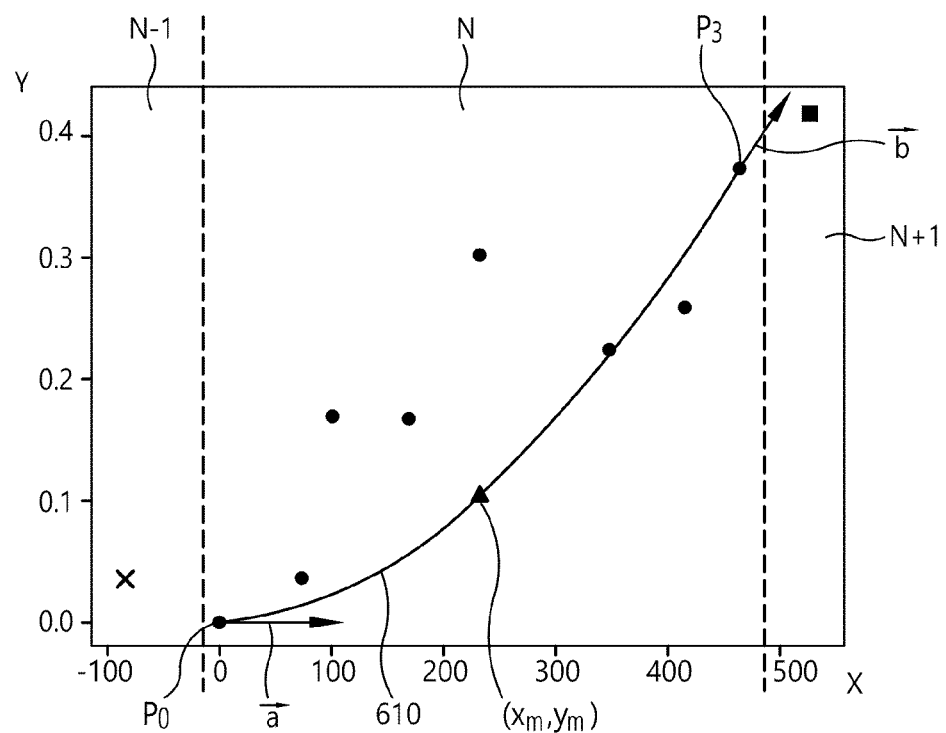
FIG. 6 is an exemplary graph provided to explain a method for generating a parametric Bézier curve based on control points calculated by using the graph of FIG. 4.

FIGS. 5 and 6 are exemplary graphs illustrating a method for generating a parametric Bézier curve by calculating the control points after setting the boundary condition for the target segment in FIG. 4.

According to the smoothing in calculating the boundary condition described above, the coordinate system rotation may be performed using, as the X-axis, a straight line connecting the last coordinate data 411 of the preceding segment N−1 and the second coordinate data 412 of the target segment N. Accordingly, the coordinate-transformed graph (or coordinate-transformed coordinate data) as illustrated in FIG. 5 is acquired.

Meanwhile, in FIG. 4, although it appears that the coordinate data forming the target segment N and the coordinate data 411 and 413 of the front and rear segments N−1 and N+1 form a single straight line, when the coordinates are transformed through the process described above, it can be seen that error is included between the coordinate data as shown in the Y axis of FIG. 5. Specifically, in FIG. 5, it can be seen that only the Y-axes of some coordinate data 411' and 412', which are the basis of rotation, are coincided, while the rest includes an error range within 0.4. Hereinafter, a method for reducing the error of the transformed coordinate data will be described.

In order to reduce the error of the transformed coordinate data, in the present disclosure, rather than using the coordinate data in place of the control points, this is directly calculated and obtained. To this end, it is necessary to acquire the midpoint of the Bézier curve together with the slope ($b'(x_0)$, $b'(x_n)$) values of the connection points of the target segment N.

There are mainly two methods that may be applied as a method for detecting the midpoint of the Bézier curve.

Figure 7:
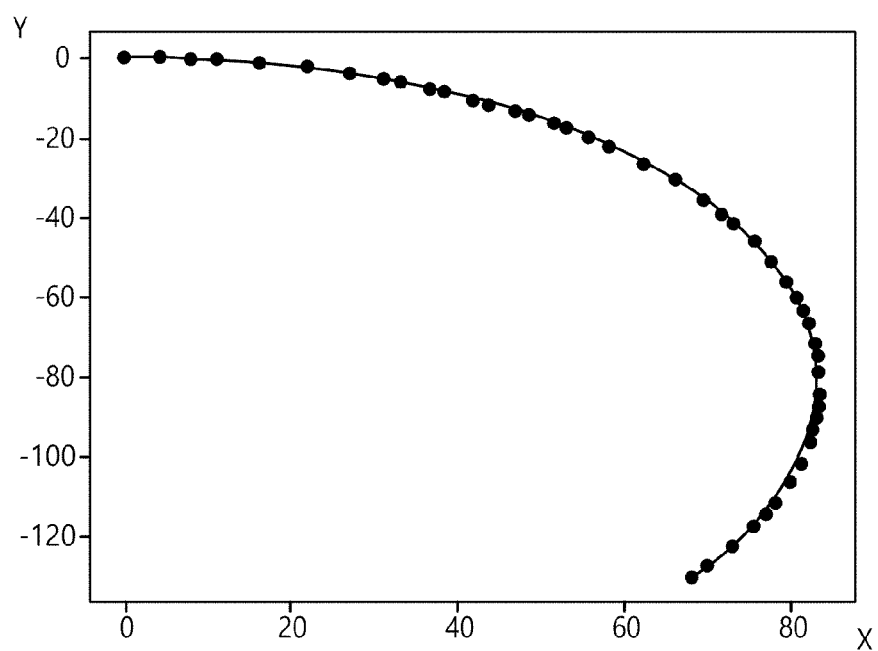
FIG. 7 is an exemplary graph illustrating a parametric Bézier curve calculated by a plurality of coordinate points according to an embodiment of the present disclosure.

In an example, the first method for detecting midpoint is a method of using, as a midpoint, a positional center point among a plurality of coordinate data forming the target segment N. This may be applicable when the expression of the polynomial function on the x, y coordinate system is impossible or complicated, as illustrated in FIG. 7.

In another example, the second method for detecting midpoint is a method of calculating the midpoint of the curve by using the slope ($b'(x_0)$, $b'(x_n)$) values and coordinate values $b(x_0)=y_0$, $b(x_n)=y_n$ of the connection points of the target segment N to determine the unique curve in a third-degree or higher polynomial. The second method for detecting midpoint may be applicable to all cases except for when there is a small amount of coordinate data forming the target segment N or it is impossible to express a polynomial function on the x, y coordinate system as illustrated in FIG. 7.

The second method for detecting midpoint generally assumes that a unique curve for the section can be determined through the k−2, ∼0-th order differentiation of the start point and the end point in the k-th degree polynomial. In general, in the case of n-th degree polynomial, since its coefficients are n+1, the coefficients of unique values can be determined when there are n+1 conditions for the n-th degree polynomial. In Equation 4 below, since b(x) is a third degree polynomial, four coefficients, that is, a, b, d, and c are required.

$$b(x) = a + bx + cx^2 + dx^3$$ [Equation 4]

In an example, the unique values of the coefficients a, b, d, and c may be calculated by using the slope values $b'(x_0)$, $b'(x_n)$ described above and the coordinate values $b(x_0)=y_0$, $b(x_n)=y_n$ as the conditions. Accordingly, the coefficients a, b, d, and c may be defined as follows.

$$a = y_0,$$

$$b = b'(x_0),$$

$$d = \left( \frac{b'(x_n) - b + \frac{2(-y_n + a + b*x_n)}{x_0}}{x_n^2} \right),$$

$$c = \frac{y_n - dx_n^3 - (a + bx_n)}{x_n^2}$$

[Equation 5]

Then, for convenience of calculation, by coinciding the x-axis with the slope b'(x₀) direction through the coordinate system transformation described above, and having the connection point as the origin (0, 0), the above can be rewritten as:

$$a = 0,$$  [Equation 6]

$$b = 0,$$

$$c = \frac{y_n - dx_n^3}{x_n^2},$$

$$d = \frac{b'(x_n)x_n - 2y_n}{x_n^3}$$

Through the calculation described above, the midpoint $(x_m, y_m)$ of the Bézier curve can be acquired. In an example, in order to calculate the midpoint $(x_m, y_m)$ of the curve by using the polynomial, a point corresponding to a half the total length of the curve may be used. For example, the midpoint Pc of a Bézier curve 610 illustrated in FIG. 6 was detected by using the second method for detecting midpoint described above.

If the midpoint is detected as described above, control points for generating a parametric Bézier curve according to the present disclosure is directly calculated based on the detected midpoint. Referring again to FIG. 1 to further explain this concept, it can be seen that the slopes of the start point P₁ and the end point P₄, that is, the boundary points of the Bézier curve shown in FIG. 1(*b*) are the same as the slopes of the control points P₂ and P₃, respectively. In addition, using the process of dividing the Bézier curve into two sections, it is possible to calculate the control points from the midpoint of the curve. In other words, when the midpoint of the curve and the slope of the boundary points are known, the control points may be calculated directly.

Specifically, in FIG. 6, a plurality of straight lines may be built by using two connection points P₀ and P₃ of the target segment N and their respective slopes b, and two arbitrary points positioned on each of the plurality of straight lines may be set as the control points. In an example, the two arbitrary points will be referred to as P₁ and P₂ for convenience of description. Then, the two arbitrary points can be expressed as Equation 3 below.

$$P_1(t)=P_0+t\vec{a}, P_2=P_2+t\vec{b}$$  [Equation 7]

Meanwhile, in the present disclosure, since the Bézier curve is represented by using the interpolation parameter P, each of the control points x and y can be expressed as a function of p as follows.

$$x(p)=a_x|b_xp|c_xp^2|d_xp^3, y(p)=a_y|b_yp|c_yp^2|d_yp^3$$  [Equation 8]

In an example, since Equation 8 is a third degree polynomial, a total of four values should be determined as the control points for obtaining a solution. In Equation 7, since the slopes $\vec{a}, \vec{b}$ can be expressed as b'(x₀), b'(x_n), respectively, and the coordinates of the midpoint are $(x_m, y_m)$, Equation 8 can be expressed as the coordinate system using Equation 7, and expressed as Equation 9 as follows.

$$x_{c,1} = \frac{8(y_m - b'(x_0)x_n) + x_n(b'(x_0) + 3b'(x_n)) - 4y_n}{3(b'(x_n) - b'(x_0))},$$  [Equation 9]

$$y_{c,1} = b'(x_n)(x_{c,1} - x_n) + y_n,$$

-continued $$x_{c,2} = \frac{8x_m - 3x_{c,1} - x_n}{3},$$

$$y_{c,2} = b'(x_0)x_{c,2}$$

If the control points $x_{c,1}, y_{c,1}, x_{c,2}, y_{c,2}$ are calculated in this way, it is now possible to generate a parametric Bézier curve for the target segment N using $x_{c,1}, y_{c,1}, x_{c,2}, y_{c,2}$. Here, since the directly calculated control points are not one of the coordinate data forming the target segment N, even when there is an error in some of the coordinate data forming the target segment N, a curve closer to the actual road may be generated regardless of the error.

FIG. 7 is an exemplary graph illustrating a parametric Bézier curve calculated by a plurality of coordinate points according to an embodiment of the present disclosure.

FIG. 7 illustrates the effect of a parametric expression of a Bézier curve generated through the process of segment boundary setting, coordinate system transformation, midpoint detection, and direct calculation of control points described above with reference to FIGS. 4 to 6. It is exemplified that the illustrated parametric Bézier curve is flexible, and in FIG. 6, the four control points are calculated to determine a unique curve for the third degree polynomial, but examples are not limited thereto. Therefore, it is possible to increase the number of control points to 5, 6, 7, and so on, and generate parametric Bézier curves for 4th degree polynomials, 5th degree polynomials, 6th degree polynomials, and so on. However, in general, the increased degree of the function means proportionally increased computational complexity and unnecessary curvature, and therefore, the present disclosure is explained using the third degree polynomial and four control points.

Figure 8:
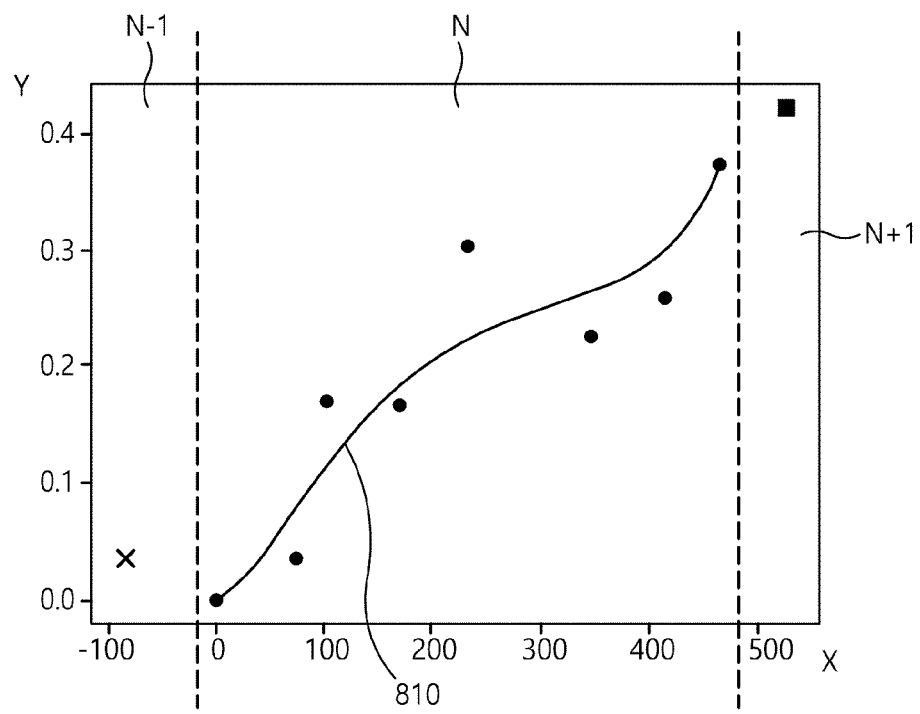
FIG. 8 is an exemplary graph provided to explain generating a curve using the graph of FIG. 4 with the method for generating road topology information according to an embodiment of the present disclosure, in comparison with the related method.
Figure 9:
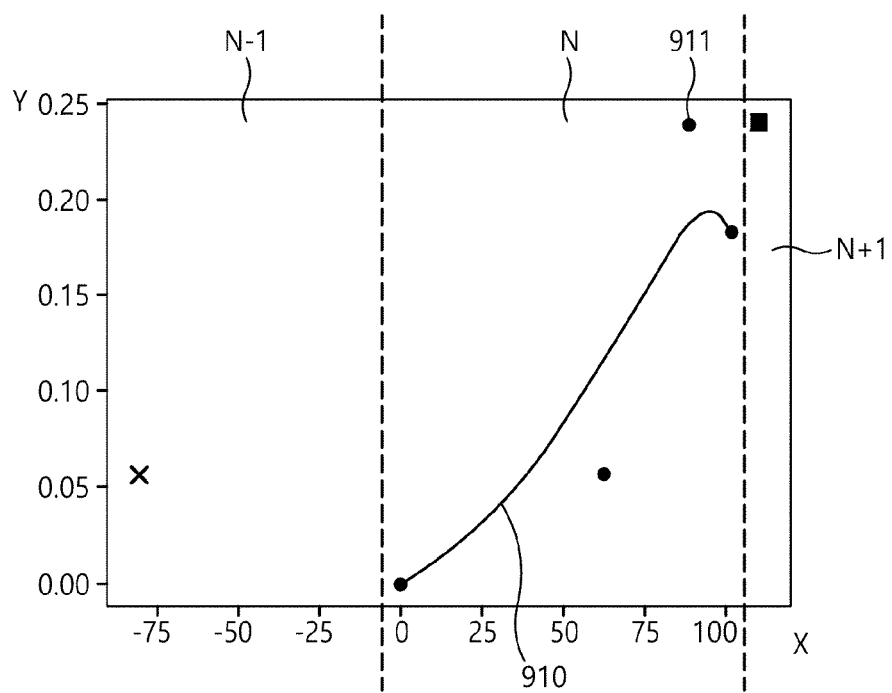
FIG. 9 is an exemplary graph provided to explain generating a curve using the graph of FIG. 4 with the method for generating road topology information according to an embodiment of the present disclosure, in comparison with the related method.

FIGS. 8 and 9 are exemplary graphs provided to explain generating a curve with respect to the segment of FIG. 4 by using the method for generating road topology information according to an embodiment of the present disclosure, in comparison with the related method.

Specifically, FIGS. 8 and 9 illustrate examples of directly applying some of the coordinate data forming the road segments as the control points for generating a Bézier curve. As an example, the Bézier curve generated by the method for generating road topology information disclosed in KR10-2017-0068021 introduced in the Background Art section is illustrated. In an example, a Bézier curve was generated as a 7th degree polynomial by using eight of the coordinate data included in the segment N as the control points.

It can be seen that a curve 810 illustrated in FIG. 8 has an unnecessary curvature change in the middle, as compared with the parametric Bézier curve according to the present disclosure illustrated in FIG. 6. This is because errors that may occur during the initial measurement of the coordinate data forming the segments are included as they are. Accordingly, the flexible Bézier curve 610 as illustrated in FIG. 6 cannot be generated, but the curve 810 having many changes in curvature is generated. If the autonomous vehicle travels along the curve 810 illustrated in FIG. 8, the driving direction will be changed unnecessarily and frequently, and the driving time will also increase. In addition, it can be seen that the curve 910 illustrated in FIG. 9 has an abrupt slope change at the boundary point connected to the next segment N+1. This is a type of Bézier curve that is generated when specific coordinate data 911 forming the target segment N includes a large error. It is predictable that this type of curve 911 would also generate the abrupt curvature change when connected to a curve (not illustrated) generated in the next segment N+1. This is because the coordinate data of the current segment N−1 is not used when calculating the boundary condition for the next segment N+1. When it is assumed that the autonomous vehicle travels along the curve 910 shown in FIG. 9 as it is, it may be difficult to find the next segment N+1 of the road (the head of the autonomous vehicle is directed towards the y-axis), making it difficult to navigate. In addition, even if the next segment N+1 of the road is found, a sudden change in the driving direction is expected, which makes the driving rough.

Figure 10:
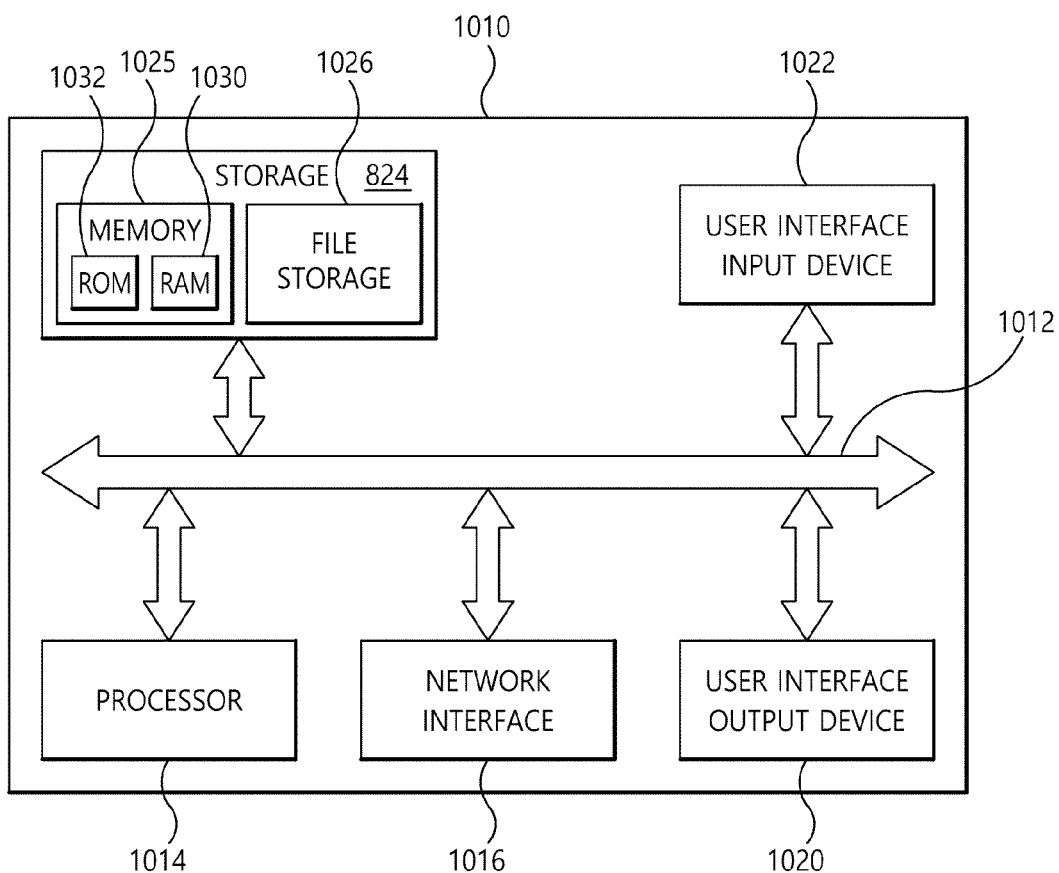
FIG. 10 is an exemplary block diagram illustrating an internal configuration of an information processing system for executing a method for generating road topology information according to an embodiment of the present disclosure.

Next, FIG. 10 is an exemplary block diagram illustrating an internal configuration of an information processing system 1010 for executing a method for generating road topology information according to an embodiment of the present disclosure.

FIG. 10 is a block diagram of an example computing device 1010 that may optionally be used to perform one or more aspects of the techniques described herein. In some implementations, one or more of the client computing device, user-controlled resource module, and/or other component(s) may include one or more components of the example computing device 1010.

The computing device 1010 may generally include at least one processor 1014 in communication with a number of peripheral devices via a bus system 1012. This peripheral devices include a storage system 1024 including a memory 1025 and a file storage 1026, a user interface output device 1020, a user interface input device 1022, and a network interface system 1016, for example. The user interface input and output devices 1020 and 1022 allow user interaction with the computing device 1010. The network interface system 1016 provides an interface to an external network and is connected to a corresponding interface device of another computing device.

The user interface input device 1022 may include a keyboard, a mouse, a trackball, a pointing device such as a touchpad or a graphics tablet, a scanner, a touch screen integrated into a display unit, an audio input device such as a voice recognition system, a microphone, and/or any other type of input devices. In general, use of the term "input device" is intended to include all possible types of devices and methods of entering information into the computing device 1010 or a communications network.

The user interface output device 1020 may include a non-visual display, such as a display subsystem, a printer, a fax machine, or an audio output device. The display subsystem may include a cathode ray tube (CRT), a flat panel device such as a liquid crystal display (LCD), a projection device, or other mechanism for generating a visible image. The display subsystem may also provide a non-visual display via an audio output device. In general, use of the term "output device" is intended to include all possible types of devices and methods of outputting information from the computing device 1010 to a user or other appliance or computing device.

The storage system 1024 stores programming and data structures that provide the functionality of some or all of the modules described above. For example, the storage system 1024 may include logic for not only performing the selected aspects of the methods of FIGS. 2 to 3 above, but also implementing the various methods, operations, configurations, and functions depicted with reference to FIGS. 4 to 6.

Such software modules may generally be executed by the processor 1014 alone or executed in combination with other processors. The memory 1025 used in the storage system 1024 may include a number of memories including a main random access memory (RAM) 1030 for storing instructions and data during program execution, and a read-only memory (ROM) 1032 in which fixed instructions are stored. The file storage 1026 may provide permanent storage for programs and data files, and may include a hard disk drive, removable media associated with a floppy disk drive, a CD-ROM drive, an optical drive, or a removable media cartridge. Modules implementing specific implementation functions may be stored by the file storage 1026 of the storage system 1024, or stored in other devices accessible by the processor 1014.

The bus system 1012 provides a mechanism that enables a communication between various components and subsystems of the computing device 1010. In FIG. 10, although the bus system 1012 is schematically illustrated as a single bus, alternative implementations of the bus system may use multiple buses.

The computing device 1010 may include various types, including workstations, servers, computing clusters, blade servers, server farms, or any other data processing system or computing device. In addition, due to the ever-changing nature of computers and networks, the description of the computing device 1010 illustrated in FIG. 10 is intended only as a specific example to illustrate certain implementations. Therefore, many other configurations of the computing device 1010 may have more or fewer components than the computing device illustrated in FIG. 10.

Furthermore, the method described above may be provided as a non-transitory computer-readable recording medium in which a program (or instructions) for execution in a computer is stored. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of this disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, examples are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method performed by a processor of an information processing system, the method comprising:
   determining a plurality of points in a target segment, wherein the target segment comprises a portion of a path of a road, and wherein each of the plurality of points corresponds to a point of the portion of the path of the road;
   determining at least one first point in a first adjacent segment, wherein each of the at least one first point corresponds to a point, of the path of the road, in the first adjacent segment, and wherein the first adjacent segment is adjacent to a first boundary of the target segment;
   determining at least one second point in a second adjacent segment, wherein each of the at least one second point corresponds to a point, of the path of the road, in the second adjacent segment, and wherein the second adjacent segment is adjacent to a second boundary of the target segment;
   determining a midpoint of a curve of the target segment, wherein the curve comprises at least two points of the plurality of points in the target segment, and wherein the midpoint of the curve is determined based on:
      the plurality of points,
      the at least one first point, and
      the at least one second point;
   generating, based on at least one control point, an adjusted curve corresponding to the path of the road in the target segment, wherein the at least one control point is based on:
      the midpoint of the curve; and
      a slope associated with the at least one first point and at least one of the plurality of points;
   outputting, based on the adjusted curve, an indication associated with adjusted coordinate data of the road; and
   causing, by outputting the indication associated with adjusted coordinate data of the road, at least one of:
      autonomous driving simulation along the path of the road; or
      autonomous driving control of a vehicle along the path of the road.

2. The method according to claim 1,
further comprising:
determining boundary conditions associated with the target segment by using:
   boundary points of the target segment;
   first coordinate data corresponding to the at least one first point in the first adjacent segment;
   second coordinate data corresponding to at least one of the plurality of points in the target segment; and
   third coordinate data corresponding to the at least one second point in the second adjacent segment.

3. The method according to claim 2,
wherein
the boundary conditions are determined by further using at least one of:
   fourth coordinate data corresponding to the at least one first point in the first adjacent segment and adjacent to the boundary points; or
   fifth coordinate data corresponding to the at least one second point in the second adjacent segment and adjacent to the boundary points.

4. The method according to claim 1,
wherein the determining the midpoint of the curve comprises:
   generating an n-th degree polynomial by using boundary conditions for the curve of the target segment; and
   determining, based on the n-th degree polynomial, the midpoint of the curve.

5. The method according to claim 1,
wherein the determining the midpoint of the curve comprises:
   based on a determination that an n-th degree polynomial cannot be generated by using boundary conditions for the curve of the target segment, detecting coordinate data positioned at a center among coordinate data forming the target segment, as the midpoint of the curve.

6. The method according to claim 1,
wherein the determining the at least one control point comprises:
determining the at least one control point by using:
the midpoint of the curve;
boundary points; and
boundary conditions.

7. The method according to claim 1, further comprising:
after generating the adjusted curve:
determining an error between the adjusted curve and coordinate data of the road; and
determining whether the error is out of a preset error range.

8. The method according to claim 7, further comprising, based on a determination that the error is out of the preset error range, dividing a section of the target segment into a plurality of sub-segments, and repeating the steps of claim 1 for each sub-segment of the plurality of sub-segments.

9. A computing device comprising:
at least one processor; and
memory storing instructions that, when executed by the at least one processor, cause the computing device to:
determine a plurality of points in a target segment, wherein the target segment comprises a portion of a path of a road, and wherein each of the plurality of points corresponds to a point of the portion of the path of the road;
determine at least one first point in a first adjacent segment, wherein each of the at least one first point corresponds to a point, of the path of the road, in the first adjacent segment, and wherein the first adjacent segment is adjacent to a first boundary of the target segment;
determine at least one second point in a second adjacent segment, wherein each of the at least one second point corresponds to a point, of the path of the road, in the second adjacent segment, and wherein the second adjacent segment is adjacent to a second boundary of the target segment;
determine a midpoint of a curve of the target segment, wherein the curve comprises at least two points of the plurality of points in the target segment, and wherein the midpoint of the curve is determined based on:
the plurality of points,
the at least one first point, and
the at least one second point;
generate, based on at least one control point, an adjusted curve corresponding to the path of the road in the target segment, wherein the at least one control point is based on:
the midpoint of the curve; and
a slope associated with the at least one first point and at least one of the plurality of points;
output, based on the adjusted curve, an indication associated with adjusted coordinate data of the road; and
causing, by outputting the indication associated with adjusted coordinate data of the road, at least one of:
autonomous driving simulation along the path of the road; or
autonomous driving control of a vehicle along the path of the road.

10. A non-transitory computer-readable recording medium storing instructions that, when executed by at least one processor, cause a computing device to:
determine a plurality of points in a target segment, wherein the target segment comprises a portion of a path of a road, and wherein each of the plurality of points corresponds to a point of the portion of the path of the road;
determine at least one first point in a first adjacent segment, wherein each of the at least one first point corresponds to a point, of the path of the road, in the first adjacent segment, and wherein the first adjacent segment is adjacent to a first boundary of the target segment;
determine at least one second point in a second adjacent segment, wherein each of the at least one second point corresponds to a point, of the path of the road, in the second adjacent segment, and wherein the second adjacent segment is adjacent to a second boundary of the target segment;
determine a midpoint of a curve of the target segment, wherein the curve comprises at least two points of the plurality of points in the target segment, and wherein the midpoint of the curve is determined based on:
the plurality of points,
the at least one first point, and
the at least one second point;
generate, based on at least one control point, an adjusted curve corresponding to the path of the road in the target segment, wherein the at least one control point is based on:
the midpoint of the curve; and
a slope associated with the at least one first point and at least one of the plurality of points;
output, based on the adjusted curve, an indication associated with adjusted coordinate data of the road; and
causing, by outputting the indication associated with adjusted coordinate data of the road, at least one of:
autonomous driving simulation along the path of the road; or
autonomous driving control of a vehicle along the path of the road.

11. The non-transitory computer-readable recording medium according to claim 10, wherein the instructions, when executed by the at least one processor, cause the computing device to:
after generating the adjusted curve:
determine an error between the adjusted curve and coordinate data of the road; and
determine whether the error is out of a preset error range.

12. The computing device according to claim 9, wherein the instructions, when executed by the at least one processor, cause the computing device to:
determine boundary conditions associated with the target segment by using:
boundary points of the target segment;
first coordinate data corresponding to the at least one first point in the first adjacent segment;
second coordinate data corresponding to at least one of the plurality of points in the target segment; and
third coordinate data corresponding to the at least one second point in the second adjacent segment.

13. The computing device according to claim 9,
wherein the instructions, when executed by the at least one processor, cause the computing device to determine the midpoint of the curve by:
generating an n-th degree polynomial by using boundary conditions for the curve of the target segment; and
determining, based on the n-th degree polynomial, the midpoint of the curve.

14. The computing device according to claim 9,
wherein the instructions, when executed by the at least one processor, cause the computing device to determine the midpoint of the curve by:
based on a determination that an n-th degree polynomial cannot be generated by using boundary conditions for the curve of the target segment, detecting coordinate data positioned at a center among coordinate data forming the target segment, as the midpoint of the curve.

15. The computing device according to claim 9,
wherein the instructions, when executed by the at least one processor, cause the computing device to determine the at least one control point by:
determining the at least one control point by using:
the midpoint of the curve;
boundary points; and
boundary conditions.

16. The computing device according to claim 9, wherein the instructions, when executed by the at least one processor, cause the computing device to:
after generating the adjusted curve:
determine an error between the adjusted curve and coordinate data of the road; and
determine whether the error is out of a preset error range.

17. The computing device according to claim 16, wherein the instructions, when executed by the at least one processor, cause the computing device to:
based on a determination that the error is out of the preset error range, divide a section of the target segment into a plurality of sub-segments.

\* \* \* \* \*